US012178217B2

(12) United States Patent
Christophis et al.

(10) Patent No.: US 12,178,217 B2
(45) Date of Patent: Dec. 31, 2024

(54) EDIBLE FILM

(71) Applicant: VISCOFAN, S.A., Tajonar-Navarra (ES)

(72) Inventors: Christof Christophis, Weinheim (DE); Hans-Joerg Menger, Weinheim (DE); Vicente Etayo, Tajonar (ES); José Ignacio Recalde, Tajonar (ES)

(73) Assignee: VISCOFAN, S.A., Tajonar-Navarra (ES)

( * ) Notice: Subject to any disclaimer, the term of this patent is extended or adjusted under 35 U.S.C. 154(b) by 189 days.

(21) Appl. No.: 17/607,330

(22) PCT Filed: Apr. 21, 2020

(86) PCT No.: PCT/EP2020/061076
§ 371 (c)(1),
(2) Date: Oct. 28, 2021

(87) PCT Pub. No.: WO2020/221622
PCT Pub. Date: Nov. 5, 2020

(65) Prior Publication Data
US 2022/0211053 A1    Jul. 7, 2022

(30) Foreign Application Priority Data
Apr. 30, 2019 (EP) .................... 19171898

(51) Int. Cl.
*A22C 13/00* (2006.01)
(52) U.S. Cl.
CPC .... *A22C 13/0016* (2013.01); *A22C 2013/002* (2013.01); *A22C 2013/0053* (2013.01); *A22C 2013/0096* (2013.01)
(58) Field of Classification Search
CPC .......... A22C 13/0016; A22C 2013/002; A22C 2013/005; A22C 2013/0096; A22C 2013/0053; A22C 2013/0073; A22C 2013/0083; Y02A 40/90
USPC ....................................................... 426/138
See application file for complete search history.

(56) References Cited

U.S. PATENT DOCUMENTS

| | | |
|---|---|---|
| 3,556,969 A | 1/1971 | Mizuguchi et al. |
| 3,682,661 A | 8/1972 | Turbak |
| 3,833,741 A | 9/1974 | Katz et al. |
| 4,580,316 A | 4/1986 | Gunter |
| 4,620,757 A | 11/1986 | Thevenaz |
| 4,683,615 A | 8/1987 | Tomczak et al. |
| 4,851,394 A | 7/1989 | Kubodera |
| 4,910,034 A | 3/1990 | Winkler |
| 5,695,800 A | 12/1997 | Merritt |
| 5,962,053 A | 10/1999 | Merritt |
| 6,190,686 B1 | 2/2001 | Isager et al. |
| 6,521,248 B1 | 2/2003 | Holloway et al. |
| 6,730,340 B1 | 5/2004 | Macquarrie et al. |
| 9,826,763 B2 | 11/2017 | Tan et al. |
| 2002/0019447 A1 | 2/2002 | Renn et al. |
| 2003/0219514 A1 | 11/2003 | Jones et al. |
| 2004/0037922 A1 | 2/2004 | Goorhuis |
| 2005/0186309 A1 | 8/2005 | Gord et al. |
| 2006/0073190 A1 | 4/2006 | Carroll et al. |
| 2014/0134319 A1 | 5/2014 | Ko et al. |
| 2015/0230513 A1 | 8/2015 | Stone et al. |
| 2015/0250203 A1 | 9/2015 | Edwards et al. |
| 2016/0023826 A1 | 1/2016 | Edwards et al. |

FOREIGN PATENT DOCUMENTS

| | | |
|---|---|---|
| BR | 112021012795 A2 | 9/2021 |
| CL | 2021001693 A1 | 1/2022 |
| CN | 1163553 A | 10/1997 |
| CN | 1385100 A | 12/2002 |
| CN | 103524794 A | 1/2014 |
| CN | 107439656 A | 12/2017 |
| CO | 2021008202 A2 | 7/2021 |
| DE | 1213211 B | 3/1966 |
| EP | 0277448 A1 | 8/1988 |
| EP | 0795270 A1 | 9/1997 |
| EP | 1378170 A1 | 1/2004 |
| EP | 2885981 A1 | 6/2015 |
| EP | 3704946 A1 | 9/2020 |
| GB | 711437 A | 6/1954 |
| GB | 778921 A | 7/1957 |
| JP | H07322812 A | 12/1995 |
| JP | H11313619 A | 11/1999 |
| JP | 2016506721 A | 3/2016 |
| JP | 2017504358 A | 2/2017 |
| JP | 2018023311 A | 2/2018 |

(Continued)

OTHER PUBLICATIONS

International Search Report and Written Opinion mailed Jun. 30, 2020 in International Patent Application No. PCT/EP2020/061076, 10 pages.
Application No. EP 20718696.6, Office Action, mailed on Jan. 27, 2023, 6 pages.
Application No. CA3130813A1, Office Action, Mailed on May 18, 2023, 5 pages.
Application No. JP2021557530A, Office Action, Mailed on May 9, 2023, 6 pages.
Application No. CL202102728A1, Office Action, Mailed on May 30, 2023, 8 pages.

(Continued)

*Primary Examiner* — Subbalakshmi Prakash
(74) *Attorney, Agent, or Firm* — Kilpatrick Townsend & Stockton LLP

(57) ABSTRACT

The present invention provides edible food casing films, a method for producing said edible food casing films, compositions for forming said edible food casing films and the use of said edible food casing films for example as a sausage casing, which food casings are hot water and sodium salt resistant, stable at high temperatures, can be easily shined and are ready to be stuffed with foodstuff, especially by meat, cheese or fish products, but also with vegetarian or vegan foodstuff.

4 Claims, No Drawings

(56) References Cited

FOREIGN PATENT DOCUMENTS

| | | | |
|---|---|---|---|
| JP | 2018057344 | A | 4/2018 |
| RU | 2223653 | C2 | 2/2004 |
| UA | 128737 | C2 | 10/2024 |
| WO | 93-19125 | A1 | 9/1993 |
| WO | 9955165 | A1 | 11/1999 |
| WO | 02-15715 | A1 | 2/2002 |
| WO | 2015-091695 | A1 | 6/2015 |
| WO | 2015108421 | A1 | 7/2015 |
| WO | 2016-027261 | A1 | 2/2016 |
| WO | 2020221622 | A1 | 11/2020 |

OTHER PUBLICATIONS

Application No. CL202102728A1, Search Report, Mailed on May 30, 2023, 3 pages.
CO Application No. 2021013929, "Office Action", Jul. 12, 2024, 16 pages.
BR112021020982.4, "Office Action", Sep. 2, 2024, 14 pages.
UAA202106485, "Office Action", Sep. 5, 2024, 5 pages.

EDIBLE FILM

CROSS-REFERENCES TO RELATED APPLICATIONS

This application is a U.S. National Phase of PCT Patent Application No. PCT/EP2020/061076, filed Apr. 21, 2020, entitled "Edible Film," which application claims the benefit of European Patent Application No. EP 19171898.0, filed on Apr. 30, 2019, entitled "Edible Film And Method For Its Manufacturing." The disclosures of each of the aforementioned applications are hereby incorporated by reference in their entirety for all purposes.

TECHNICAL FIELD OF THE INVENTION

The present invention relates to edible food casing films, a method for producing said edible food casing films, compositions for forming said edible food casing films and the use of said edible food casing films for example as a sausage casing, which food casings are readily chewable and show improved stuffing and cooking properties. Furthermore, said edible food casing films can be easily shirred without destruction (optionally together with an outer netting) and are ready to be stuffed by foodstuff, especially by meat, cheese or fish products, but also vegetarian or vegan foodstuff.

BACKGROUND ART OF THE INVENTION

For many years commercially available foodstuff casings which are suitable or intended for co-consumption, were made of natural skins (especially porcine and sheep's intestines) and collagen casings. Said conventional synthetic or natural casings are usually formed as a long, continuous tube which is drawn from a supply source.

However, because of animal diseases, such as BSE or pig disease, there are strong reservations with respect to ethical and religious issues against the use of natural skins and collagen casings.

Furthermore, the edible sausage casings based on calcium alginate (see for example DE 1 213 211 B) which have been developed as a substitute have proved technically unsatisfactory. Owing to an interaction between for example the sausage meat emulsion and the brine, the barely soluble calcium alginate is gradually converted into the more readily soluble sodium alginate. As a result the casings lose stability.

Furthermore, GB 711 437 A and GB 778 921 A disclose a method for producing an autonomous artificial sausage casing made of alginate. It is taught in said documents that the sausage casing can be produced by forming a viscous solution of an alginate, extruding the solution through an annular nozzle into a coagulating liquid and allowing the formed tubular casing to be fixed.

Also known in the respective field of the art are biodegradable, if appropriate even edible, shaped bodies made of a thermoplastic mixture which comprises as essential constituents native or modified starch and protein (see for example WO 1993 019 125 A1). In the shaped bodies starch and protein are bound together by a crosslinking agent, such as formaldehyde, glutaraldehyde or epichlorohydrin. The thermoplastic mixture can, in addition, comprise further ingredients such as plasticizers, lubricants, fillers, antimicrobial substances and/or colorings. When subjecting such a mixture to deep-drawing, injection molding, blow molding or a similar process, shaped bodies may be produced, for example films, capsules, dishes, bottles, pipes. However, for tubular food casings, in particular cooking-stable sausage casings, the thermoplastic mixture is less suitable, since starch dissolves at least in part in hot water. For an edible sausage casing the material described in WO 1993 019 125 A1 moreover is too tough. Furthermore, the presence of a crosslinking agent in such a food casing may affect the taste of the food product, and many proteins tend to color the coating when the food product given a coating is boiled or fried.

Furthermore, U.S. Pat. No. 3,682,661 A discloses self-supporting (i.e., non-stuffed or empty) tubular casings made from vegetable proteins derived from corn, wheat, peanuts or soybeans. U.S. Pat. No. 3,682,661 A teaches that these casings can be produced by dispersing a vegetable protein in water, extruding the vegetable protein dispersion through an annular die so as to form a vegetable protein tube, and thereafter coagulating, curing, plasticizing and drying the extruded vegetable protein casing.

In addition, US 2005 0 186 309 A1 discloses a tubular, edible food casing which comprises cellulose, at least one protein and at least one filler, wherein the food casing comprises cellulose in an amount of from 20 to 70% by weight based on the dry solids weight of the casing, the at least one protein in an amount of from 5 to 50% by weight based on the dry solids weight of the food casing, and the at least one filler in an amount of from 10 to 70% by weight based on the dry solids weight of the casing.

These cellulose casings are usually manufactured by using a so-called viscose process wherein cellulose which in an unmodified state is insoluble in water, is reacted with carbon disulfide so as to form cellulose xanthate (also called as viscose rayon) which is soluble for example in aqueous soda solutions. Once a tube has been formed by extruding the viscose rayon it is passed through a regeneration bath wherein said cellulose xanthate is converted back into insoluble cellulose. Thereafter, the chemical reagents and other reaction products are washed away.

However, the cellulose casings produced in such a way, lack favorable organoleptic and nutritional characteristics with respect to biting, chewing, salivation, and swallowing.

In order to overcome these drawbacks US 2005 186 309 A discloses casings comprising regenerated cellulose, at least one globular protein and a filler. US 2005 186 309 A teaches that such casings can be produced by using a so-called NMMO (N-methyl-morpholine oxide) method wherein N-methyl-morpholine oxide (NMMO) is used as a solvent for dissolving cellulose. However, the NMMO method is not suitable for producing casing products for human consumption, because NMMO is a toxic substance which cannot completely be removed from the casings manufactured by this method.

Furthermore, WO 2002 015 715 A1 discloses compositions for coating foodstuffs which comprise a first polysaccharide and at least one second polysaccharide, wherein said first polysaccharide is negatively charged in the composition and gels under the influence of cations, wherein the first polysaccharide is selected from the group consisting of alginate, pectin, carrageenan or a combination thereof, and wherein said at least one second polysaccharide is neutral in the composition, wherein the at least one second polysaccharide comprises cellulose, a cellulose derivative and a galactomannan selected from the group consisting of methylcellulose, hydroxypropylcellulose, methylethylcellulose, guar gum, carob gum or a combination thereof. WO 2002 015 715 A1 does not mention a glucomannan as an example of the neutral polysaccharides to be used. Furthermore, WO 2002 015 715 A1 teaches that said coating compositions can be used for directly coating a food product by co-extrusion as well as for producing exempt casings (for subsequent filling).

CN 1 385 100 A discloses flat films for food packaging comprising Konjac glucomannan and a manufacturing method thereof. In said manufacturing method a basic composition comprises 5 to 80% konjac flour, 10 to 90% of alginate, 0.5 to 5% of plasticizer, and 0.5 to 5% curing agent, wherein glycerol or ethylene glycol is used as plasticizer and calcium chloride or calcium citrate is used as curing agent. The manufacturing method disclosed in CN 1 385 100 A comprises the steps of mixing konjac flour and alginate in water in the above-mentioned amounts at temperatures of 40 to 50° C., stirring and kneading the mixture, adding plasticizer under continued stirring and thereafter spraying the slurry on a steel belt. Then, the film is crosslinked and solidified by using calcium chloride or calcium citrate as curing agent. Thereafter, the film formed is dehydrated and desalted by immersing said film into a water tank containing a 30 to 95% ethanol solution as a dehydrating agent, and finally dried.

As CN 1 385 100 A does not include a step of deacetylating the starting material Konjac glucomannan during the manufacturing method disclosed in said document, the flat films formed do not comprise deacetylated Konjac glucomannan. Therefore, the films described in CN 1 385 100 A suffer from the drawback that these films cannot be used as self-supporting tubular food casings which can be stuffed with food.

In general, in order to use the casing efficiently and effectively, an individual length of the tubular food casing drawn from the source is "shirred" (gathered up longitudinally). This allows a large quantity of casing to be folded and positioned in a sausage or food packing machine for subsequent controlled unfolding as required as the casing material is filled with product. The shirring of casings for meat products such as sausage is well known in the food processing art. Two typical examples of the numerous prior art patents disclosing equipment for the shirring of casing are afforded by U.S. Pat. Nos. 4,580,316 A and 4,683,615 A.

Increasingly, it has been sought to prepare food sealing and packaging materials comprising only non-animal based natural materials, owing to dietary and other considerations. U.S. Pat. No. 4,620,757 A describes a multilayer heat-sealable edible film for sealing and packaging materials like powdered soup, flavoring oil, dried vegetables, etc., which comprises a water-soluble polysaccharide film layer (chiefly carrageenan, a polyhydric alcohol and water) and a lower-film layer containing a combination of soybean protein and gelatin.

U.S. Pat. No. 6,730,340 A describes edible casing formulations incorporating carrageenan in conjunction with konjac and/or gellan gums. Such a film, in a typical application, is wrapped around a meat substrate (turkey, ham, chicken) and the wrapped meat dried in a convection oven, until a protein skin is seen to form. Cooking is then completed in a steam cooker. The film exhibits various desirable properties, including imparting an appealing surface appearance to the cooked product.

Furthermore, Example 5 of U.S. Pat. No. 6,730,340 A teaches an edible film composition comprising 30 parts by weight of carrageenan, 15 parts by weight of konjac gum (glucomannan) and 20 parts by weight of alginate (=weight ratio carrageenan+alginate to konjac gum=3.33). However, said Example 5 does not teach a method wherein said film composition is used to produce a self-supporting casing comprising a thermo-irreversible gel structure.

In addition, it is to be outlined that the casings described in U.S. Pat. No. 6,730,340 A1 which comprise carrageenan in combination with other polysaccharide gums are partially soluble in water and, thus, unstable in hot water. Therefore, these casings cannot be used for the manufacture of numerous types of sausages which should be subjected to a cooking (heating) or smoking treatment.

Another technique which does not produce self-supporting casings is a co-extrusion method wherein a film-forming solution is forced through a groove that surrounds the edge of a generally round orifice through which a dough or paste of for example processed meat is extruded (see for example EP 2 885 981 A1 or WO 2015 091 695 A1). The film-forming solution exits the groove at a speed similar to that of the meat and forms a coating on the surface of the meat extruded. As it is well known to a person skilled in the art film-forming solutions used in such a co-extrusion method must have a viscosity which is high enough to maintain cohesion in the form of a flat or tubular sheet, at least long enough to harden. Especially if the co-extrusion is carried out horizontally, the coating of the lower part of the worm tends to detach by gravity. For this reason, in the co-extrusion technique, a film-forming composition is needed which, in addition to having an adequate viscosity, is capable of gelling very quickly, and preferably almost immediately upon its release and deposition on the meat.

OBJECT OF THE INVENTION

It is an object of the present invention, therefore, to provide an edible (suitable for co-consumption), food casing film which is readily chewable and shows improved stuffing and cooking properties. Furthermore, it is an object of the present invention to provide compositions for producing said edible food casing films and the use of said edible food casing films in producing edible food casings to be filled with foodstuff such as vegetables, fish or meat.

SUMMARY OF THE INVENTION

The present invention provides an edible food casing film comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and a glucomannan, wherein said at least one hydrocolloidal vegetable gum is present in an amount of from 24 to 80 weight % based on the dry solids weight (per $m^2$) of the edible food casing film and the weight ratio of said at least one hydrocolloid to said at least one hydrocolloidal vegetable gum is in a range of from 0.2 to 1.45:1.0 to 3.0 based on the dry solids weight (per $m^2$) of the edible food casing film.

In a preferred embodiment of the present invention said at least one water-soluble hydrocolloidal vegetable gum which forms a thermo-irreversible water-insoluble gel, is selected from the group consisting of gellan gum, a galactoglucomannan and deacetylated konjac glucomannan, more preferably gellan gum and deacetylated konjac glucomannan, most preferably deacetylated konjac glucomannan.

According to the present invention the term "glucomannan" is a hydrocolloidal heteropolysaccharide wherein the component sugars are β-(1→4)-linked D-glucose and D-mannose monosaccharide units in the ratio of 1:1.6. A glucomannan with α-(1→6)-linked galactose units in side branches is called galactoglucomannan. Konjac glucomannan usually contains approximately one acetyl ester group per 10 to 19 sugar residues. The acetyl ester group imparts konjac glucomannan with a negative charge. The partial or complete removal of said acetyl ester groups strengthens the intermolecular association of konjac glucomannan molecules such that they form stronger gel and films. Konjac glucomannan solution gels if it is heated after treatment or exposure to alkali. This gelation occurs as a result of the hydrolysis of acetyl groups which no longer hinder intermolecular hydrogen bonding of the molecules. This process is also known as "deacetylation" of konjac glucomannan.

According to the present invention the absence of non-deacetylated konjac glucomannan and, thus, the presence of deacetylated konjac glucomannan for example may be detected by FTIR spectroscopy. If deacetylated konjac glucomannan is present in the edible film food casing according to the present invention, in an FTIR spectrum of the product an absorption peak of 1732 cm$^{-1}$ (due to a C=O stretching of acetyl groups in non-deacetylated konjac glucomannan) is absent in the product.

Furthermore, in a further preferred embodiment of the present invention the edible food casing film comprises as an additional component at least one component selected from the group consisting of xanthan gum and a galactomannan, wherein preferably the galactomannan may be selected from the group consisting of tara gum, locust bean gum, cassia gum, and guar gum.

The present invention also provides a composition for producing said edible food casing films comprising water and a mixture comprising at least one hydrocolloid which can be chemically coagulated selected from the group consisting of an alginate sat, carrageen and pectin, and at least one water-soluble hydrocolloidal vegetable gum which forms a thermo-irreversible water-insoluble gel selected from the group consisting of gellan gum and a glucomannan, wherein said at least one hydrocolloidal vegetable gum is present in an amount of from 24 to 80 weight % based on the dry solids weight (per m$^2$) of the edible food casing film and the weight ratio of said at least one hydrocolloid to said at least one hydrocolloidal vegetable gum is in a range of from 0.2 to 1.45:1.0 to 3.0 based on the dry solids weight (per m$^2$) of the composition.

In a preferred embodiment said composition for forming edible food casing films has a viscosity, measured with a Brookfield DV2T HB viscometer and a T-D-94 spindle, at a rotational speed of 60 rpm and a temperature of 20° C., in a range of from 0.1 to less than 200 Pa·s.

DETAILED DESCRIPTION OF THE INVENTION

According to the present invention it was found that in the edible food casing film claimed a combination of the at least one hydrocolloid which can be chemically coagulated and at least one water-soluble hydrocolloidal vegetable gum which forms a thermo-irreversible water-insoluble gel, provides better characteristics so as to produce a food casing showing improved stuffing and cooking properties as well as an excellent storage stability.

According to the present invention, the term "food casing film" means a casing which can serve as packaging for consumer goods and permits handling and storage thereof. The edible food casing film according to the present invention can be used to form a tubular food casing as described for example in U.S. Pat. No. 4,910,034 A. By "tubular" is meant according to the invention an elongated flexible body, which—without any restriction to it—may be shaped to contain a cylindrical shape. According to the present invention said tubular food casing formed by a food casing film according to the present invention may be further stabilized by an outer netting (see for example U.S. Pat. No. 4,910,034 A). Consumer goods in particular mean food products, such as sausage and meat products, including their vegetarian or vegan alternatives, vegetables, such as carrot pieces or peas, and fish. Preferred sausages include fried and cooked sausages, such as Vienna sausages. The food casing film according to the invention is also suitable for wrapping any other consumer goods, such as animal feed.

According to the present invention the term a "hydrocolloid which can be chemically coagulated" means a group of polysaccharides which form a colloid in aqueous solution and react with the monovalent or polyvalent cations such as $K^+$, $Mg^{2+}$, $Ca^{2+}$, $Ba^{2+}$, $Cu^{2+}$, $Fe^{2+}$, $Zn^{2+}$ or $Al^{3+}$ so as to form a gel. According to the present invention the hydrocolloids which can be chemically coagulated are selected from the group consisting of an alginate, carrageen, and pectin.

According to the present invention the term a "water-soluble hydrocolloidal vegetable gum which forms a thermo-irreversible water-insoluble gel" means a polysaccharide which forms a colloid in aqueous solution and which is able to polymerize in a three-dimensional porous structure or net wherein the polymer molecules are linked together by physical or chemical forces, which structure may retain water molecules in its structure, and wherein said structure is thermo-irreversible so that it does not return to a depolymerized status when heating the structure; and nor it can be completely dissolved when warm water of a temperature of for example 60° C. is added.

According to the present invention the term "monoextrusion" means a technique commonly referred to in the art as "extrusion" in which an extrudable composition is pressed through an extrusion head of an extrusion apparatus without simultaneous extrusion of the consumer product to be wrapped, so as to produce a self-supporting food casing that can be used to wrap consumer goods at a later stage. The "monoextrusion" or "extrusion" differs from the term "coextrusion" wherein a composition forming the food casing is pressed through an extrusion head at the same time or together with the consumer goods to be enclosed therein (see for example in WO 2016 027 261A1). Monoextrusion produces a food casing film as an immediate product of the process carried out. Further steps such as sewing, gluing, welding, vulcanizing, etc., two edges of a flat membrane or flat film can be performed if needed so as to obtain a tubular food casing.

The present invention provides a composition for forming an edible food casing film which composition can be monoextruded and which is also suitable for packaging vegetarian and vegan consumer goods. According to the present invention "exempt" edible food casing films for wrapping or packaging consumer goods are produced, which can be stably stored, if necessary, over several days, months or years without any difficulties. Filling said edible food casing film with the consumer goods can be done at a later stage for example by a process as described in U.S. Pat. No. 4,910,034 A. The food casing film according to the present invention, therefore, is an independent commodity which can be supplied, for example, to the food-producing and processing industry to be used for filling or coating at a later stage.

According to the present invention the edible food casing film usually has a thickness of from 1 to 80 μm, preferably 5 to 60 μm, more preferably 10 to 35 μm. Furthermore, the edible food casing film according to the present invention usually has a width of from 10 to 80 cm, preferably 20 to 60 cm and more preferably 35 to 60 cm. In addition, the edible food casing film according to the present invention usually has a length of up to 100 m, preferably 80 m, more preferably 60 m.

According to the present invention a shape-assisting elastic netting may be provided outside the edible food casing film, for example an elastic netting as described in U.S. Pat. No. 4,910,034 A.

The edible food casing film according to the present invention preferably is characterized by one or more of the following characteristics:
- composed merely of plant raw materials;
- suitable for filling with meat, vegetarian/vegan materials as well as kosher and halal, or fish;
- stably storable and easy to handle; not needed to be coextruded simultaneously with the sausage;
- ready to be stuffed and cooked for example with food emulsions and/or doughs using standard equipment for sausage production without damage due to an excellent elasticity;
- excellent smoking and cooking properties for example in smokehouses and/or standard cooking cycles due to an excellent thermostability;
- imparting an appealing shiny and/or transparent appearance;
- providing a pleasant biting and chewing impression for example when used as a food casing for sausages.

In the following the compulsory components and optional components of the edible food casing film are discussed in more detail. It goes without saying that these statements equally apply to the composition for forming an edible food casing film as defined above:

According to the present invention the at least one hydrocolloid which can be chemically coagulated, is selected from the group consisting of an alginate salt, carrageen and pectin.

According to the present invention the term "an alginate salt" refers to the alginates which are commonly used in the food industry, preferably propylene glycol alginate, potassium alginate, ammonium alginate, sodium alginate or calcium alginate.

In the edible food casing films according to the present invention the at least one hydrocolloid which can be chemically coagulated, is present so as to produce strong films exhibiting good storage stability.

In a preferred embodiment of the present invention said at least one hydrocolloid which can be chemically coagulated is an alginate for example sodium alginate.

Furthermore, according to the present invention said at least one water-soluble hydrocolloidal vegetable gum which forms a thermo-irreversible water-insoluble gel, is selected from the group consisting of gellan gum and a glucomannan.

In a preferred embodiment of the present invention said at least one hydrocolloidal vegetable gum is a glucomannan, preferably konjac glucomannan, more preferably partially deacetylated konjac glucomannan, most preferably deacetylated konjac glucomannan.

According to the present invention it was found that excellent properties for edible films can be achieved by including as said at least one water-soluble hydrocolloidal vegetable gum which forms a thermo-irreversible water-insoluble gel selected from the group consisting of a gellan gum and/or a glucomannan, because said components are excellent non-thermoreversible gel-forming polymers. Konjac glucomannan can be extracted from the konjac tuber. This polysaccharide hydrates immediately and can form either thermoreversible or non-thermoreversible gels, depending on the conditions under which the gel is formed. Gellan gum is a polysaccharide gum produced from bacterial fermentation.

Both gellan gum and deacetylated konjac glucomannan are strong gel formers and produce gels that are non-thermoreversible. Both Konjac glucomannan and gellan gums are edible and GRAS rated (=generally recognized as safe under Sections 201(s) and 409 of the Federal Food, Drug and Cosmetic Act in the US). Konjac glucomannan tends to form gels having a higher degree of elasticity than gellan gum, which forms gels having a more brittle texture.

According to the present invention in addition to deacetylated konjac glucomannan some non-deacetylated konjac glucomannan may also be present in the edible food casing film according to the present invention, provided that the amount of non-deacetylated konjac glucomannan does not exceed a ratio of 40%, more preferably 25%, even more preferably 20% based on the weight of deacetylated konjac glucomannan present in the edible film food casing (per $m^2$). In a preferred embodiment non-deacetylated konjac glucomannan is only present in an amount of 15% or less based on the weight (per $m^2$) of deacetylated glucomannan present in the edible food casing film according to the present invention.

By using said hydrocolloidal vegetable gums, furthermore, the viscosity of the composition for forming an edible food casing film can be easily adjusted.

In a further preferred embodiment of the present invention the edible food casing film comprises as an additional component at least one component selected from the group consisting of xanthan gum and a galactomannan, wherein the galactomannan may be selected from the group consisting of tara gum, locust bean gum, cassia gum, and guar gum.

Furthermore, the edible food casing film may comprise starch, for example a modified starch, dialdehyde starch or a natural starch such as tapioca starch, cellulose, such as cellulose fibers, microcrystalline cellulose, cellulose powder and/or a cellulose derivative, and/or a protein such as pea protein, potato protein, sunflower protein, rice protein, soy protein, whey protein, casein, gluten, eggwhite and chick pea protein.

According to the present invention starch usually functions in such a way so as to improve water distribution during drying of the film. In a preferred embodiment a high-amylose starch may be used, because high-amylose starch may be a better film former than other starches. The presence of some starch component may be adequate to provide a good casing adhesion to the foodstuff.

The use of a vegetable and/or animal protein may be desirable so as to provide the casing with improved adhesion. The addition of a vegetable and/or animal protein may result in better adhesion between the product and the sheath. In the production of vegan casings only proteins of plant or non-animal origin should be used, whereas in vegetarian products proteins of animal origin can also be used.

According to the present invention the at least one hydrocolloid which can be chemically coagulated selected from the group consisting of an alginate salt, carrageen and pectin, is usually present in an amount of from 20 to 76 weight %, preferably 30 to 60 weight %, more preferably 30 to 50 weight %, more preferably 35 to 45 weight %, based on the dry solids weight (per $m^2$) of the edible food casing film.

Furthermore, according to the present invention the at least one water-soluble hydrocolloidal vegetable gum which forms a thermo-irreversible water-insoluble gel is present in an amount of from 24 to 80 weight %, preferably 30 to 70 weight %, more preferably 35 to 65 weight %, more preferably 40 to 60 weight %, more preferably 45 to 60 weight %, more preferably 45 to 55 weight %, based on the dry solids weight (per m$^2$) of the edible food casing film.

Furthermore, according to the present invention the additional component selected from the group consisting of xanthan gum and a galactomannan, may be present in an amount of from 0 to 30 weight %, preferably 5 to 25 weight %, more preferably 5 to 20 weight %, more preferably 7 to 18 weight %, more preferably 8 to 15 weight %, based on the dry solids weight (per m$^2$) of the edible food casing film.

Furthermore, according to the present invention the additional component selected from the group starch and a protein, may be present in an amount of from 0 to 40 weight %, preferably 5 to 20 weight %, more preferably 5 to 18 weight %, more preferably 8 to 17 weight %, based on the dry solids weight (per m$^2$) of the edible food casing film.

According to the present invention the weight ratio of said at least one hydrocolloid to said at least one hydrocolloidal vegetable gum is in a range of from 0.2 to 1.45:1.0 to 3.0, preferably in a range of from 0.2 to 1.25:1.0 to 3.0, more preferably in a range of from 0.2 to 1.0:1.1 to 3.0, more preferably 0.5 to 1.0:1.1 to 2.0, based on the dry solids weight (per m$^2$) of the edible food casing film.

In a preferred embodiment the present invention provides an edible food casing film comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and deacetylated konjac glucomannan, wherein said at least one hydrocolloid which can be chemically coagulated, is present in an amount of from 20 to 70 weight % based on the dry solids weight (per m$^2$) of the edible food casing film, wherein said at least one water-soluble hydrocolloidal vegetable gum is present in an amount of from 30 to 70 weight % based on the dry solids weight (per m$^2$) of the edible food casing film and wherein the weight ratio of said at least one hydrocolloid to said at least one hydrocolloidal vegetable gum is in a range of from 0.2 to 1.25:1.0 to 3.0 based on the dry solids weight (per m$^2$) of the edible food casing film.

In a preferred embodiment the present invention provides an edible food casing film comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and a glucomannan, wherein said at least one hydrocolloid which can be chemically coagulated, is present in an amount of from 20 to 70 weight % based on the dry solids weight (per m$^2$) of the edible food casing film, wherein said at least one water-soluble hydrocolloidal vegetable gum is present in an amount of from 30 to 70 weight % based on the dry solids weight (per m$^2$) of the edible food casing film and wherein the weight ratio of said at least one hydrocolloid to said at least one hydrocolloidal vegetable gum is in a range of from 0.2 to 1.25:1.0 to 3.0 based on the dry solids weight (per m$^2$) of the edible food casing film.

In a further preferred embodiment the present invention provides an edible food casing film comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and a glucomannan, wherein said at least one hydrocolloid which can be chemically coagulated, is present in an amount of from 30 to 50 weight % based on the dry solids weight (per m$^2$) of the edible food casing film, wherein said at least one water-soluble hydrocolloidal vegetable gum is present in an amount of from 40 to 60 weight % based on the dry solids weight (per m$^2$) of the edible food casing film and wherein the weight ratio of said at least one hydrocolloid to said at least one hydrocolloidal vegetable gum is in a range of from 0.5 to 1.0:1.1 to 2.0 based on the dry solids weight (per m$^2$) of the edible food casing film.

In a further preferred embodiment the present invention provides an edible food casing film comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and deacetylated konjac glucomannan, wherein said at least one hydrocolloid which can be chemically coagulated, is present in an amount of from 30 to 50 weight % based on the dry solids weight (per m$^2$) of the edible food casing film, wherein said at least one water-soluble hydrocolloidal vegetable gum is present in an amount of from 40 to 60 weight % based on the dry solids weight (per m$^2$) of the edible food casing film and wherein the weight ratio of said at least one hydrocolloid to said at least one hydrocolloidal vegetable gum is in a range of from 0.5 to 1.0:1.1 to 2.0 based on the dry solids weight (per m$^2$) of the edible food casing film.

In a further preferred embodiment the present invention provides an edible food casing film comprising at least one hydrocolloid which can be chemically coagulated selected from the group consisting of an alginate salt, carrageen and pectin, at least one water-soluble hydrocolloidal vegetable gum which forms a thermo-irreversible water-insoluble gel selected from the group consisting of gellan gum and a glucomannan, and one additional component selected from the group consisting of xanthan gum and a galactomannan, wherein the galactomannan may be selected from the group consisting of tara gum, locust bean gum, cassia gum, and guar gum, wherein said at least one hydrocolloid which can be chemically coagulated, is present in an amount of from 30 to 50 weight % based on the dry solids weight (per m$^2$) of the edible food casing film, wherein said at least one water-soluble hydrocolloidal vegetable gum is present in an amount of from 40 to 60 weight % based on the dry solids weight (per m$^2$) of the edible food casing film, wherein said additional component is present in an amount of from 5 to 20 weight % based on the dry solids weight (per m$^2$) of the edible food casing film and wherein the weight ratio of said at least one hydrocolloid to said at least one hydrocolloidal vegetable gum is in a range of from 0.5 to 1.0:1.1 to 2.0 based on the dry solids weight (per m$^2$) of the edible food casing film.

In a further preferred embodiment the present invention provides an edible food casing film comprising at least one hydrocolloid which can be chemically coagulated selected from the group consisting of an alginate salt, carrageen and pectin, at least one water-soluble hydrocolloidal vegetable gum which forms a thermo-irreversible water-insoluble gel selected from the group consisting of gellan gum and a glucomannan, one additional component selected from the group consisting of xanthan gum and a galactomannan, wherein the galactomannan may be selected from the group consisting of tara gum, locust bean gum, cassia gum, and guar gum, and a protein wherein said at least one hydrocolloid which can be chemically coagulated, is present in an amount of from 30 to 50 weight % based on the dry solids weight (per m$^2$) of the edible food casing film, wherein said at least one water-soluble hydrocolloidal vegetable gum is present in an amount of from 40 to 60 weight % based on the dry solids weight (per m$^2$) of the edible food casing film, wherein said additional component is present in an amount of from 5 to 20 weight % based on the dry solids weight (per m$^2$) of the edible food casing film, wherein said protein is present in an amount of from 5 to 15 weight % based on the dry solids weight (per m$^2$) of the edible food casing film and wherein the weight ratio of said at least one hydrocolloid to said at least one hydrocolloidal vegetable gum is in a range of from 0.5 to 1.0:1.1 to 2.0 based on the dry solids weight (per m$^2$) of the edible food casing film.

In a further preferred embodiment the present invention provides an edible food casing film comprising at least one hydrocolloid which can be chemically coagulated selected from the group consisting of an alginate salt, carrageen and pectin, at least one water-soluble hydrocolloidal vegetable gum which forms a thermo-irreversible water-insoluble gel selected from the group consisting of gellan gum and deacetylated konjac glucomannan, one additional component selected from the group consisting of xanthan gum and a galactomannan, wherein the galactomannan may be selected from the group consisting of tara gum, locust bean gum, cassia gum, and guar gum, and a protein wherein said at least one hydrocolloid which can be chemically coagulated, is present in an amount of from 30 to 50 weight % based on the dry solids weight (per m$^2$) of the edible food casing film, wherein said at least one water-soluble hydrocolloidal vegetable gum is present in an amount of from 40 to 60 weight % based on the dry solids weight (per m$^2$) of the edible food casing film, wherein said additional component is present in an amount of from 5 to 20 weight % based on the dry solids weight (per m$^2$) of the edible food casing film, wherein said protein is present in an amount of from 5 to 15 weight % based on the dry solids weight (per m$^2$) of the edible food casing film and wherein the weight ratio of said at least one hydrocolloid to said at least one hydrocolloidal vegetable gum is in a range of from 0.5 to 1.0:1.1 to 2.0 based on the dry solids weight (per m$^2$) of the edible food casing film.

The edible food casing film according to the present invention can further comprise an additional additive such as a plasticizer, a crosslinking agent (so as to increase the toughness of the edible food casing film), a coloring agent, a flavoring agent, a plant fiber (so as to reduce blocking of an edible food casing film) and/or vegetal oil (so as to reduce blocking of an edible food casing film).

As a plasticizer according to the present invention there can be used for example a polyol, glycerol, propylene glycol and/or sorbitol. The edible food casing film according to the present invention may comprise said plasticizer in an amount of from 1 to 70% by weight, preferably from 5 to 50 weight %, more preferably from 10 to 25 weight %, based on the dry solids weight (per m$^2$) of the edible food casing film.

As a crosslinking agent according to the present invention there can be used a liquid smoke, a dialdehyde, transglutaminase or other usual crosslinking agents. The edible food casing film according to the present invention may comprise said crosslinking agents in an amount of from 0.001 to 0.8 weight %, preferably from 0.01 to 0.3 weight % based on the dry solids weight (per m$^2$) of the edible food casing film.

Furthermore, the edible food casing film according to the present invention may comprise minor amounts of modifiers, such as caramel color or spice color preparations for example made from paprika or turmeric and various liquid spice extracts, and/or flavoring agents such as both natural and artificial flavours including rosemary extract, oregano extract, maple flavour, sweeteners, and honey flavours.

In addition, the edible food casing film according to the present invention may comprise minor amounts of antimicrobial agents, for example bacteriocins, sorbates, benzoates, and soluble lactates such as sodium lactate, methyl and propyl parabens, and/or antioxidants, such as rosemary extracts, oregano extracts and ascorbic acid derivatives.

Furthermore, the water content of the edible food casing film according to the present invention is important. The water content usually should not exceed about 35 weight % based on the total dry solids weight (per m$^2$) of the final edible food casing film in order to avoid that the food casing film becomes so adhesive that it adheres to itself unduly. On the other hand, if the water content of the edible food casing film is too low, for example less than about 8 weight % based on the total dry solids weight (per m$^2$) of the final edible food casing film, the edible food casing film is insufficiently elastic and becomes brittle.

The edible food casing film according to the present invention can be employed in different ways:
- in a flat film shape, as for example for manually wrapping a small food portion or rolling a food portion;
- by forming a tubular shape by using an edible food casing film as described for example in U.S. Pat. No. 4,910,034 A. In such a typical use, a flat film may be conformed to a "tube" (or more exactly, a "tubular space") to wrap a food product, e.g. an elongated ham or sausage.
- in a shirred status as described for example in EP 1 378 170 A1. This can then be used in a conventionally automated manufacture of e.g. hams on a stuffing machine, wherein individual lengths of hose material are shirred prior to each section of the food casing being filled.

According to the present invention during the optional shirring process the edible food casing film usually is mechanically folded onto a mandrel. The process will typically utilize some type of shirring fluid to ensure that the folding occurs in a consistent way and that the folds remain in place following shirring. For conventional casings, the most common shirring fluids utilized, are water and mineral or vegetable oil. For the edible food casing films according to the present invention usually an aqueous shirring fluid or preferably mineral or vegetable oil is used so as to obtain good results in the preparation of a filled food casing.

In a preferred embodiment said composition for producing edible food casing films has a viscosity, measured with a Brookfield DV2T HB viscometer and a T-D-94 spindle, at a rotational speed of 60 rpm and a temperature of 20° C., in a range of from 0.1 to less than 200 Pa·s.

Furthermore, the present invention provides a method for producing a food casing film for consumer goods, comprising the following steps:
(1) preparing a composition according to the invention as defined above,
(2) mixing the composition with water,
(3) extruding the composition through an extrusion device and coagulating the extruded material so as to form a film structure;
(4) subjecting the film structure to a deacetylation step so as to form a casing film: and
(5) drying the casing film.

This method is particularly suitable for the production of a vegetarian or vegan self-supporting food casing. According to the present invention surprisingly considerably fewer process steps are required for obtaining the vegetarian or vegan food casing film than for obtaining a non-vegetarian or collagen-containing casing.

The features, properties, refinements, developments and advantages of the composition according to the invention apply correspondingly to the process according to the invention.

According to the present invention the deacetylation step is usually carried out by treating the film structure with a gaseous alkaline material or an alkaline solution.

In a preferred embodiment said deacetylation step includes a step of applying an alkaline solution, preferably a NaOH solution, onto the edible food casing film when or after emerging the film structure from the extrusion device, until the edible food casing film has a pH value of from 7 to about 13, preferably from 8 to about 12, more preferably from 8.5 to 10.5.

In one embodiment of the method according to the invention, the composition is subjected to the following step during or after step (2) and before step (3):

(2.1) degassing of the composition, preferably under vacuum, more preferably under a vacuum of at least 200 mbar.

This measure has the advantage that the product texture and the consistency of the edible food casing film can be improved.

According to the present invention the method for producing a food casing film for consumer goods comprises a step of extruding the composition through an extrusion device. According to the present invention for example a slit extruder head can be used.

In an embodiment of the method according to the invention, step (3) as defined above is carried out as follows:

(3.1) Coagulating the composition on the extrusion apparatus when leaving the extrusion head by adding a coagulating solution to obtain a coagulated film.

The edible food casing film solidifies immediately and has sufficient stability to be transported through the extrusion channel.

According to a preferred embodiment of the method according to the invention in step (3.1) the coagulation solution should be evenly applied to the edible food casing film when emerging from the extrusion device or the extrusion head.

By this measure, a stabilized edible food casing film is already formed when emerging from the extrusion head.

According to a development of the method according to the invention, the coagulation solution contains polyvalent cations, and is preferably a calcium chloride solution, more preferably a solution comprising 5 to 45 weight % of calcium chloride.

By doing such a coagulation solution a good and stable coagulation can be achieved. In one embodiment of the method according to the invention, the coagulation solution comprises a plasticizer, preferably glycerol, more preferably about 1 to 70 weight %, more preferably about 20 to 50 weight % and most preferably about 43 weight % of glycerol.

When using a plasticizer operability of the edible food casing film can be improved.

In one embodiment of the invention, the coagulation solution further comprises a crosslinking agent, for example, liquid smoke, glutaraldehyde, transglutaminase, preferably in an amount of from 0.002 to 0.2 weight %.

By using a crosslinking agent as defined above the stability of the edible food casing film can be improved. Additionally or alternatively, crosslinking of the edible food casing film can also be effected by applying heat or UV radiation.

In a preferred embodiment of the method according to the present invention the method comprises after step (4) at least one of the following steps:

(4.1) Subjecting the film structure to a monoaxial or biaxial stretching step so as to improve the mechanical strength of the casing in the longitudinal and/or transverse direction; and/or (4.2) applying heat to the casing in order to dry and strengthen the casing. Also, the thermal stability of the edible food casing film can be increased.

The present invention further provides use of composition comprising water and a mixture comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and a glucomannan, wherein said at least one water-soluble hydrocolloidal vegetable gum is present in an amount of from 30 to 70 weight % based on the dry solids weight (per $m^2$) of the edible food casing film and the weight ratio of said at least one hydrocolloid to said at least one hydrocolloidal vegetable gum is in a range of from 0.2 to 1.25:1.0 to 3.0 based on the dry solids weight (per $m^2$) of the edible food casing film, for producing an edible food casing film.

In one embodiment the composition comprising water and a mixture comprising at least one hydrocolloid which can be chemically coagulated selected from the group consisting of an alginate salt, carrageen and pectin, and at least one water-soluble hydrocolloidal vegetable gum which forms a thermo-irreversible water-insoluble gel selected from the group consisting of gellan gum and a glucomannan, can have a total solid content of 2 to 20 weight %, preferably 3 to 8 weight %.

EXAMPLES

The present invention will now be explained in more detail by means of exemplary embodiments from which further features, properties and advantages of the invention result. The embodiments are not limiting.

It is also understood that individual features disclosed in one or more of the embodiments described, are disclosed not only in the context of the specific embodiment but in a general sense. Therefore, a person skilled in the art can freely combine these features with other features of the invention.

1. Viscosity Determination

The viscosity is determined using a Brookfield DV2T HB viscometer. For this purpose, a 250 ml plastic cup with the mass to be examined is filled to the edge and air-free. The temperature of the mass should be kept constant. Viscosity measurements are carried out at 20° C. If necessary, the mass is cooled in a refrigerator or heated in a heating cabinet. On the viscometer the spirit level is checked before each use and corrected, if necessary. After switching on the device, all relevant parameters of the device appear on the screen for 5 seconds. After that, the screen automatically changes to 'Auto Zero' mode. This process sets the device to zero, which is required when the device is turned on. When zeroing, no measuring body may be mounted in the device. Pressing the 'Next' initiates the 'Auto Zero' process. During the process, the device must not be touched. After finishing 'Auto Zero', press 'Next' to change to the parameter configuration field.

Configuring the test parameters:

TABLE 1

| | |
|---|---|
| Speed | 60 RPM |
| Spindle | T-D 94 |
| Multipoint | 2 sec |
| End Condition | 180 sec |

The spindle T-D 94 is attached to the viscometer.
Measurement:

The plastic cup with the mass is placed under the measuring body. The temperature sensor is fixed to the edge of the cup and the measuring body is carefully immersed approx. 2-3 cm deep in the center of the cup. The measuring body must be readjusted so that the torque display is set to 'zero'. The measurement is started with the 'Run' key. On the screen 'Running Viscosity Test' appears with the individual recorded values, such as viscosity, torque and temperature.

During the measurement care should be taken that the torque is in the range of 10-100%. When the torque exceeds 100%, the viscosity is displayed with EEE. If the torque is below 10%, the values in the data field flash. In both cases the measurement is repeated with the other measuring body (torque>100% of a smaller spindle, torque<10% of a larger spindle). With the key 'View Test' the configured parameters can be called up. After the timeout, 'Results Table' will appear on the screen with the individual data and the helipath drive unit should be turned off. To display the average of the complete measurement, press the arrow key and select 'Post Test Averaging'.
Evaluation:

The final result is the number average value of two measurements. The unit is Pa·s (pascal second) or McP (million centipoises).

2. Raw Materials

In the tests carried out by the inventors, the following raw materials were used:

Sodium alginate: Sodium Alginate 300 cps HI-GEL, Bioscience Food Solutions GmbH, Siegburg, Germany;

Konjac glucomannan: Konjac gum YZ-J-36A, TER Chemicals GmbH & Co KG, Hamburg, Germany;

Pea protein: Vitessence Pulse 1550, Ingredion Germany GmbH, Hamburg, Germany;

Potato protein: Solanic 300, Avebe U.A., Veendam, The Netherlands;

Guar gum: Guar gum 5000 cps 200 mesh, Bioscience Food Solutions GmbH, Siegburg, Germany;

Starch: Unipectine OF 305 C, Cargill GmbH, Frankfurt am Main, Germany;

3. Results

The inventors tested 5 different masses. These are given in Table 2 below:

TABLE 2

| tested masses | | |
|---|---|---|
| Mass JJ | Amount [g] | Solid |
| Sodium alginate | 840 | 2.1% |
| Konjak glucomannan | 1400 | 3.5% |
| Starch | 560 | 1.4% |
| Water | 37200 | |
| Sum | 40000 | 7.0% |
| Mass HI | Amount [g] | Solid |
| Sodium alginate | 1190 | 3.0% |
| Konjak glucomannan | 1870 | 4.7% |
| Pea protein | 340 | 0.9% |
| Water | 36600 | |
| Sum | 40000 | 8.5% |
| Mass IJ | Amount [g] | Solid |
| Sodium alginate | 1280 | 3.2% |
| Konjak glucomannan | 1600 | 4.0% |
| Guar gum | 320 | 0.8% |
| Water | 36800 | |
| Sum | 40000 | 8.0% |
| Mass DF | Amount [g] | Solid |
| Sodium alginate | 2640 | 6.6% |
| Guar gum | 320 | 0.8% |
| Starch | 560 | 1.4% |
| Water | 36480 | |
| Sum | 40000 | 8.8% |
| Mass KL | Amount [g] | Solid |
| Alginate | 1440 | 3.2% |
| Konjak glucomannan | 1800 | 4.0% |
| Guar gum | 360 | 0.8% |
| Potato protein | 300 | 0.7% |
| water | 41400 | |
| Sum | 45300 | 8.6% |

The pH of the masses is between 6 and 9.

The invention claimed is:

1. A method for producing a flat self-supporting edible food casing film comprising the following steps: (1) preparing a composition comprising water and a mixture comprising at least one hydrocolloid which forms a colloid in aqueous solution selected from the group consisting of an alginate salt and pectin, and at least one water-soluble hydrocolloidal vegetable gum which forms a thermo-irreversible water-insoluble gel selected from the group consisting of gellan gum and a glucomannan, wherein said at least one water-soluble hydrocolloid which forms a colloid in aqueous solution, is present in an amount of from 30 to 60% (w/w) based on the dry solids weight (per m$^2$) of the edible food casing film, wherein said at least one water-soluble hydrocolloidal vegetable gum is present in an amount of from 30 to 70% (w/w) based on the dry solids weight (per m$^2$) of the edible food casing film and the weight ratio of said at least one hydrocolloid to said at least one hydrocolloidal vegetable gum is in a range of from 0.2 to 1.25:1.0 to 3.0 based on the dry solids weight of the composition;

(2) mixing the composition with water;
(3) extruding the composition through an extrusion device without simultaneous extrusion of a consumer product to be enclosed therein, and coagulating the extruded material so as to form a flat film structure;

(4) subjecting the flat film structure to a deacetylation step so as to form a flat casing film; and (5) drying the flat casing film;

Wherein the composition is subjected to the following step during or after step (2) and before step (3);

(2.1) degassing the composition under vacuum.

2. The method according to claim 1, wherein step (3) is carried out as follows:

(3.1) coagulating the composition on the extrusion apparatus by adding a coagulating solution to obtain a coagulated edible food casing film.

3. The method according to claim 2, wherein in step (3.1) the addition of the coagulation solution is carried out such that it is applied to one side and/or to the other side of the edible food casing film when emerging from the extrusion device.

4. The method according to claim 1, wherein after step (4), the following step is carried out:

(4.1) subjecting the casing film which is still in a gel status, to a monoaxial or biaxial stretching step so as to improve the mechanical strength of the casing in the longitudinal and/or transverse direction; and/or (4.2) applying heat to the casing in order to dry and strengthen the casing film.

* * * * *